(12) United States Patent
Jindal et al.

(10) Patent No.: US 7,376,977 B2
(45) Date of Patent: May 20, 2008

(54) DEFENSE AGAINST VIRUS ATTACKS

(75) Inventors: Dinesh K. Jindal, Naperville, IL (US); Venkateshwar Nandam, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 782 days.

(21) Appl. No.: 10/856,454

(22) Filed: May 28, 2004

(65) Prior Publication Data
US 2005/0278788 A1    Dec. 15, 2005

(51) Int. Cl.
*G06F 17/30* (2006.01)
(52) U.S. Cl. ............................. 726/30; 726/27; 726/26
(58) Field of Classification Search .................. 726/24, 726/23, 22, 26, 27, 30
See application file for complete search history.

(56) References Cited

OTHER PUBLICATIONS

How To Maintain Intranet Security When Downloading Executables; http://www.microsoft.com/technet/archive/ie/maintain/0497exe.mspx?mfr=true, printed Sep. 14, 2007.*
RFC 2726—PGP Authentication for RIPE Database Updates; http://www.faqs.org/rfcs/rfc2726.html, Dec. 1999.*
Detecting Internet worms at early stage Shigang Chen; Ranka, S.; Selected Areas in Communications, IEEE Journal on vol. 23, Issue 10, Oct. 2005 pp. 2003-2012.*
Computer attack trends challenge Internet security Householder, A.; Houle, K.; Dougherty, C.; Computer vol. 35, Issue 4, Part Supplement, Apr. 2002 pp. 5-7.*
Cognitive authentication schemes safe against spyware Weinshall, D.; Security and Privacy, 2006 IEEE Symposium on May 21-24, 2006 p. 6.*

* cited by examiner

*Primary Examiner*—David Y Jung

(57) ABSTRACT

A method, software, and computer system for defending against virus attacks is described. Assume that a computer system receives an instruction to run an executable file. Before the computer system runs the executable file, the computer system determines if the executable file is certified to run on the computer system. If the executable file is not certified, then the computer system prevents the executable file from running. If the executable file is certified, then the computer system determines if the executable file has been modified since being certified. If the executable file has been modified, then the computer system prevents the executable file from running. If the executable file has been certified and has not been modified, then the computer system runs the executable file. Because many viruses are included in executable files, virus attacks may be prevented by requiring executable files to be certified before they can run.

17 Claims, 6 Drawing Sheets

DEFENSE AGAINST VIRUS ATTACKS

BACKGROUND OF THE INVENTION

1. Field of the Invention

The invention is related to the field of computer systems, and in particular, to systems, methods, and software for defending against virus attacks on computer systems.

2. Statement of the Problem

Many people use computers daily at work or at home. One problem hampering computer users is computer viruses. A computer virus is typically understood to mean an unwanted software program that operates on a computer to do harm to the computer. The virus may erase data files, create operating errors, or otherwise infect the computer.

Computers typically operate with three main elements. A first element is the operating system that creates the environment for operating the computer. A second element is the executable files that perform a pre-defined set of actions, such as programs and script files. A third element is the data files. A majority of the computer viruses exist as executable files that run on a computer. The executable files may be sent via email, web downloads, or some other manner.

When an executable file representing a virus ends up on a computer and is subsequently executed, the virus may perform a set of destructive steps on the computer. The virus may cause a loss of information on the computer, a loss of time to install patches to repair the computer harmed by the virus or to prevent future virus attacks, or other problems. Viruses may also require companies or organizations to have a staff on hand to handle virus attacks and track down those initiating the viruses. Unfortunately, there is currently no effective way to control whether an executable file is run or not once the executable file is on the computer. As long as there is no control on the execution of an executable file, the executable file runs on the computer if the computer is so instructed. If the executable file happens to be a virus, then the computer will most likely be infected with the virus.

SUMMARY OF THE SOLUTION

The invention solves the above and other related problems by preventing an executable file from running unless the executable file has been certified to run. Because many viruses are included in executable files, virus attacks may be prevented by requiring executable files to be certified before they can run. That way, any executable file that has been downloaded without passing through a certification process will not be allowed to run and will not be allowed to perform any unintended action on a computer. The certification process advantageously gives computers and operating systems another layer of protection against viruses. This saves on the time and money required to handle virus attacks.

One embodiment of the invention describes a method of operating a computer system before the computer system runs an executable file. First, the computer system receives an instruction to run an executable file. Before the computer system runs the executable file, the computer system determines if the executable file is certified to run on the computer system. To be "certified" means that the executable file has been previously authenticated and authorized to run on a specific computer system. If the computer system determines that the executable file is not certified, then the computer system prevents the executable file from running. If the computer system determines that the executable file is certified, then the computer system determines if the executable file has been modified since being certified for the computer system. If the computer system determines that the executable file has been modified, then the computer system prevents the executable file from running. If the computer system determines that the executable file is certified for this computer system and has not been modified since being certified, then the computer system runs the executable file.

The invention may include other exemplary embodiments described below.

DESCRIPTION OF THE DRAWINGS

The same reference number represents the same element on all drawings.

DETAILED DESCRIPTION OF THE INVENTION

FIGS. 1-7 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
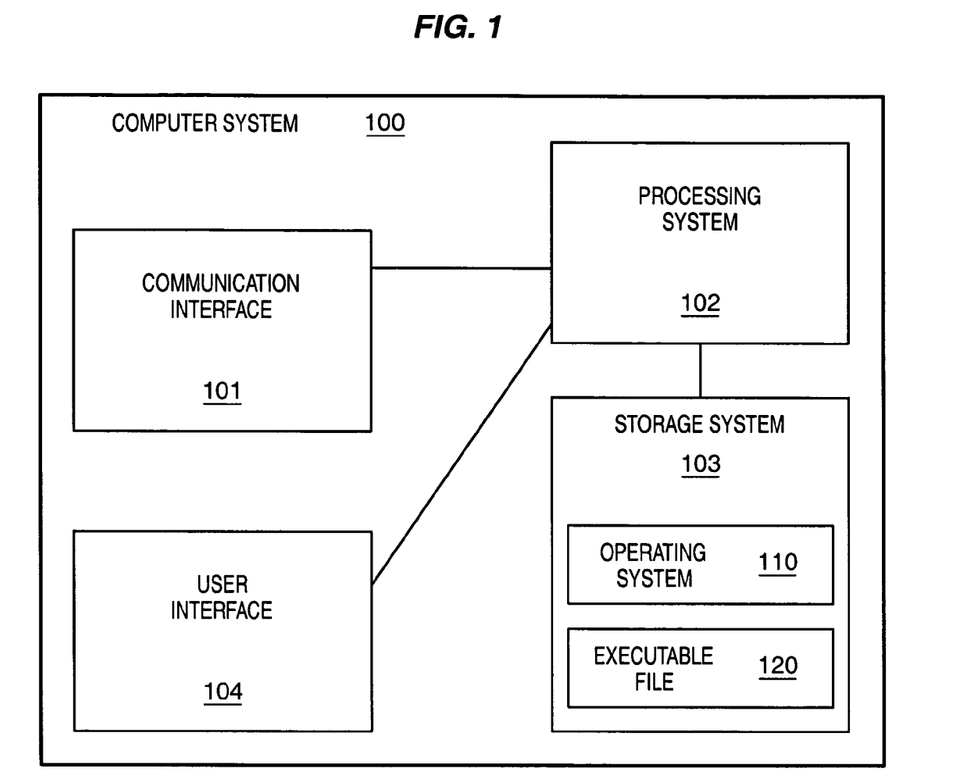
FIG. 1 illustrates a computer system in an exemplary embodiment of the invention.

FIG. 1 illustrates a computer system 100 in an exemplary embodiment of the invention. Computer system 100 includes a communication interface 101, a processing system 102, a storage system 103, and a user interface 104. Storage system 103 stores operating system 110 and executable file 120. Processing system 102 operates according to operating system 110. When computer system 100 or processing system 102 is referenced in this description, the function of computer system 100 or processing system 102 may be attributed to operating system 110. Processing system 102 is linked to communication interface 101, storage system 103, and user interface 104.

Computer system 100 could be comprised of a programmed general-purpose computer, such as a desktop computer or a laptop computer. Processing system 102 could comprise a computer microprocessor, logic circuit, or some other processing device. Storage system 103 could comprise a disk, tape, CD, integrated circuit, server, or some other memory device. Storage system 102 may be distributed among multiple memory devices. User interface 104 could comprise a display, keyboard, mouse, voice recognition interface, graphical display, touch-screen, or some other type of user device.

Executable file 120 comprises any software, script file, or program that performs a pre-defined set of actions. Executable file 120 is shown as being stored in storage system 103, but executable file 120 may be in a "desktop" or other location of operating system 110, in an email (such as in Microsoft Outlook or another email application), or in another location that processing system 102 can access. Executable file 120 may have been loaded onto computer system 100 by a user, may have been received in an email, may have been received in a web download, etc.

Figure 2:
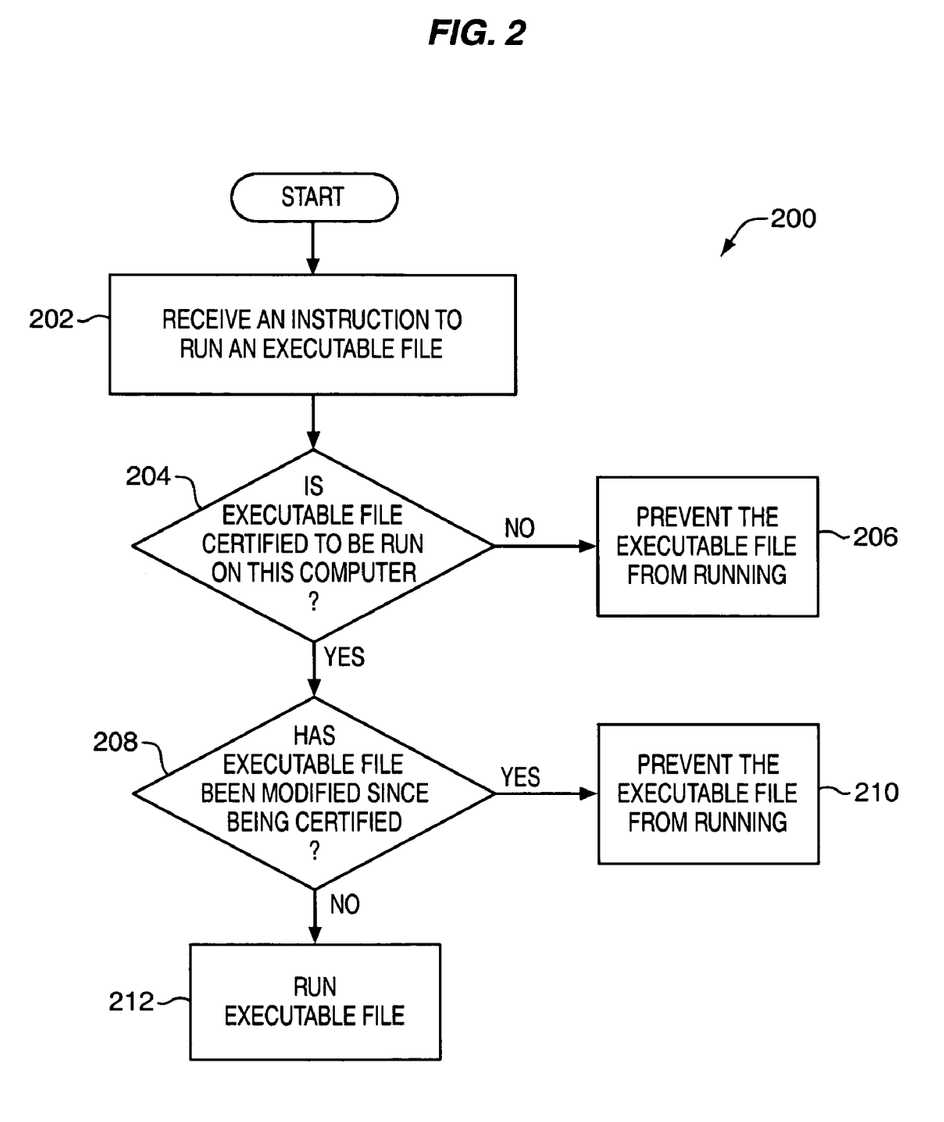
FIG. 2 is a flow chart illustrating a method of operating a computer system before the computer system runs an executable file in an exemplary embodiment of the invention.

FIG. 2 is a flow chart illustrating a method 200 of operating computer system 100 before computer system 100 runs executable file 120 in an exemplary embodiment of the invention. In step 202, computer system 100 receives an instruction to run an executable file 120. The instruction may be from the user of computer system 100 through user interface 104, may be from an external system or device through communication interface 101, or may come from an internal application. Before computer system 100 runs the executable file 120, computer system 100 determines if the executable file 120 is certified to run on computer system 100 in step 204. To be "certified" means that the executable file has been previously authenticated and authorized to run on a specific computer system. The authentication and authorization may be done by computer system 100 or another computer system. The authentication and authorization is done by a valid user or users who are properly authorized to give such certification. If computer system 100 determines that the executable file 120 is not certified for computer system 100, then computer system 100 prevents the executable file 120 from running in step 206. Computer system 100 may perform further steps as discussed below. Computer system 100 may also delete the executable file 120.

If computer system 100 determines that the executable file 120 is certified for computer system 100, then computer system 100 determines if the executable file 120 has been modified since being certified for computer system 100, in step 208. To be "modified" means that the executable file was altered, tampered with, or otherwise changed either intentionally or unintentionally. If computer system 100 determines that the executable file 120 has been modified, then computer system 100 prevents the executable file 120 from running in step 210. Computer system 100 may perform further steps as discussed below. Computer system 100 may also delete the executable file 120.

If computer system 100 determines that the executable file 120 has been certified for computer system 100 and has not been modified since being certified, then computer system 100 runs the executable file 120 in step 212. Method 200 may include further steps for desired implementations.

In case the executable file 120 was not executed (either because it wasn't certified to run on computer system 100 or it was modified), computer system 100 may provide additional options to the user on how to proceed (in steps 206 and 210). For instance, one option may be to re-certify the executable file 120 (see process 400 in FIG. 4). Another option may be to run the executable file 120 even if it is not certified for computer system 100 if the executable file 120 is certified to run on another computer within the same enterprise, company, university, etc. Another option may be to delete the executable file 120.

Figure 3:
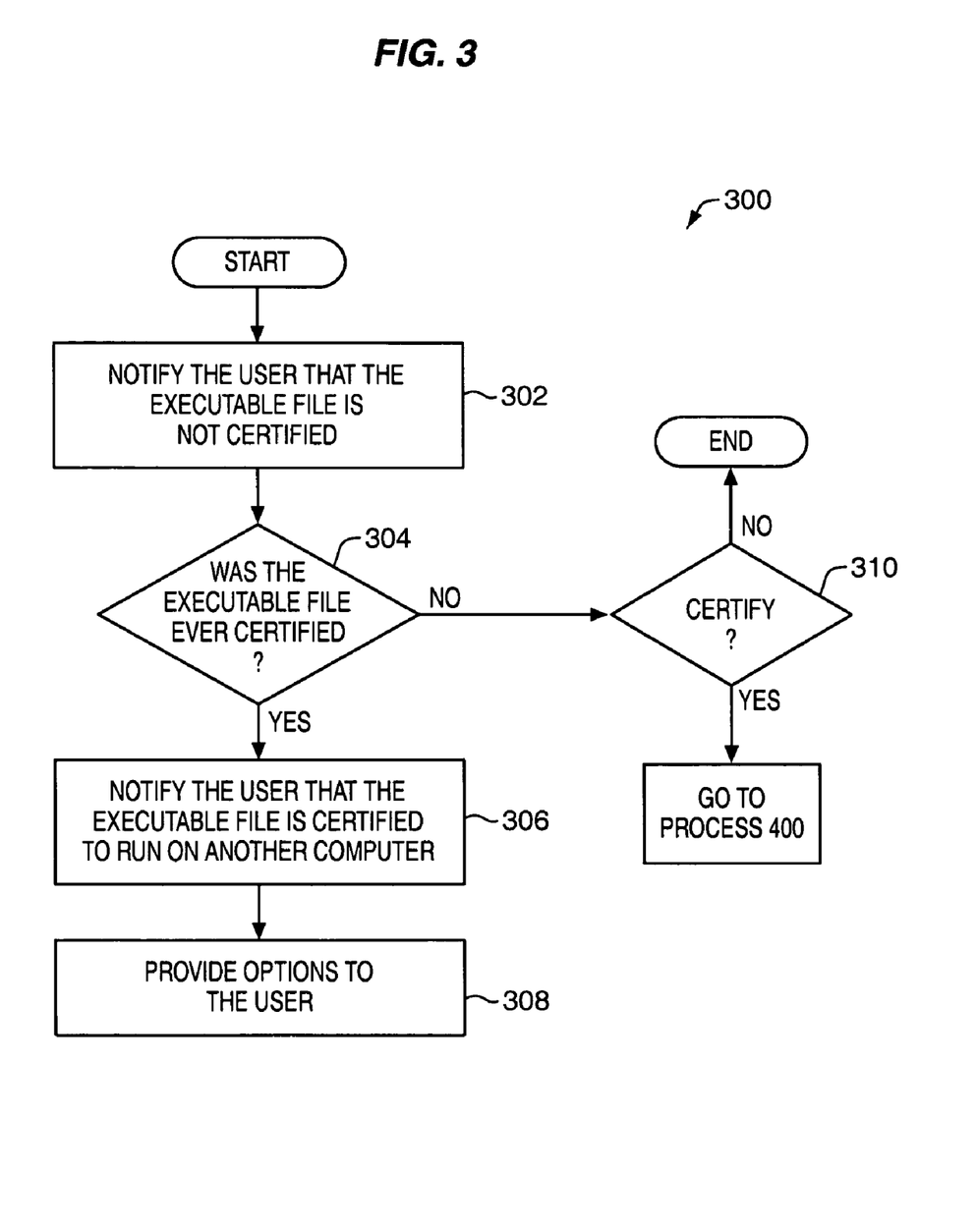
FIG. 3 is a flowchart illustrating a process in an exemplary embodiment of the invention.

FIG. 3 is a flowchart illustrating a process 300 in an exemplary embodiment of the invention. In FIG. 2, if computer system 100 determines that the executable file 120 is not certified in step 204, then computer system 100 may perform the steps of process 300. In step 302, computer system 100 notifies the user of computer system 100 that the executable file 120 is not certified. Computer system 100 may notify the user with a pop-up window or similar message. In step 304, computer system 100 determines if the executable file 120 was ever certified, such as being certified to run on another computer. If computer system 100 determines that the executable file 120 has never been certified, then computer system 100 prompts the user whether or not he/she wants to certify the executable file 120 in step in step 310. If the user wants to certify the executable file, then computer system 100 performs process 400 described as follows in FIG. 4.

If computer system 100 determines that the executable file 120 is certified but not for computer system 100 in step 304, then computer system 100 notifies the user accordingly in step 306. Computer system 100 then provides options to the user on how to proceed in step 308. For instance, one option may be to certify the executable file 120 (see process 400 in FIG. 4). Another option may be to run the executable file 120 even if it is not certified for computer system 100 if the executable file 120 is certified to run on another computer within the same enterprise, company, university, etc, and it can be verified that the executable file 120 is identical to the executables installed on those trusted entities. Another option may be to delete the executable file 120.

Figure 4:
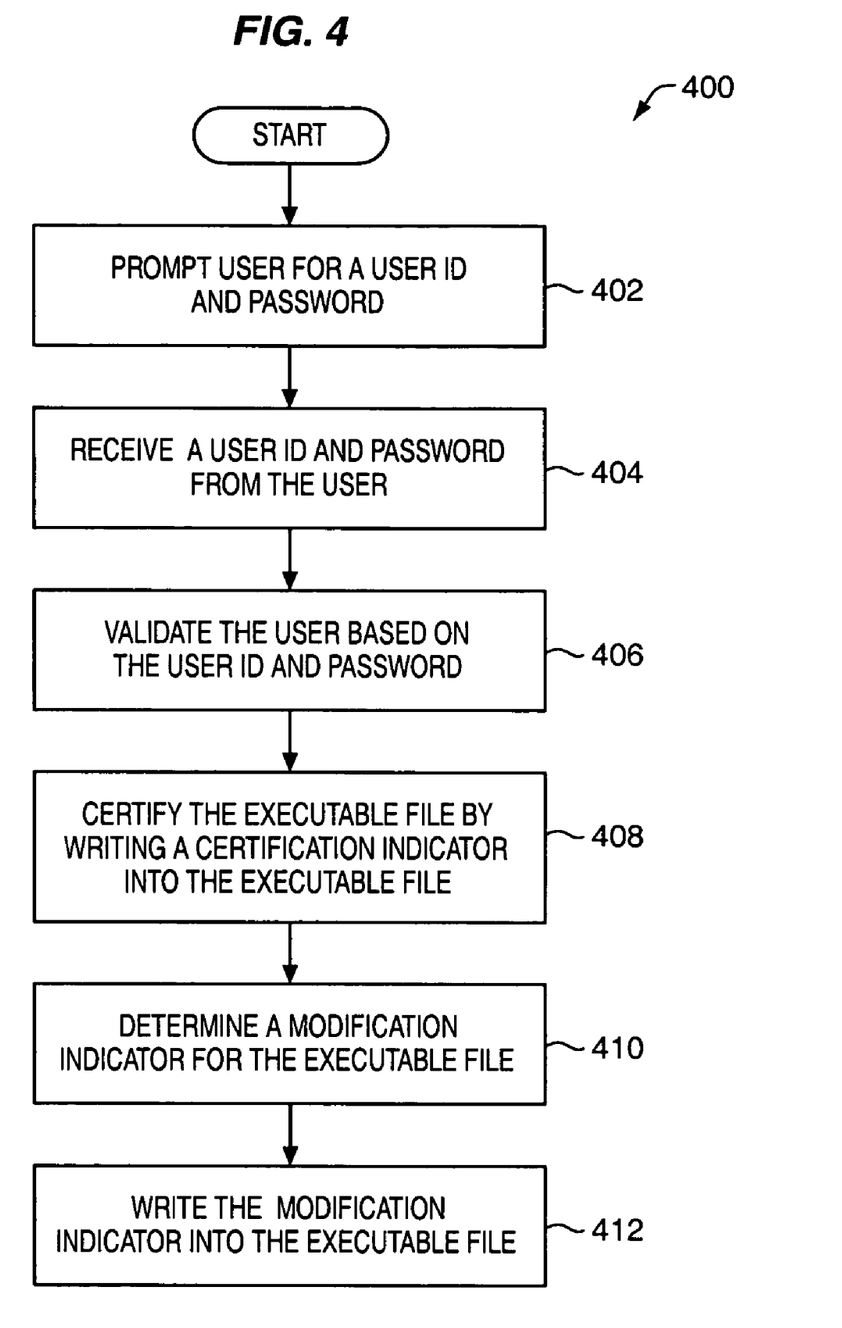
FIG. 4 is a flow chart illustrating another process to certify executable files in an exemplary embodiment of the invention.

FIG. 4 is a flow chart illustrating a process 400 to certify executable files in an exemplary embodiment of the invention. Process 400 may be executed by a valid user on demand, or automatically called from one or more steps of FIG. 3. In step 402, computer system 100 prompts the user for a user ID and a password. Computer system 100 may prompt the user for other information and identification. In step 404, the computer system 100 receives the user ID and password. Computer system 100 will have a list of user IDs and passwords that identify those who are allowed or authorized to certify executable files for this computer system 100. Computer system 100 validates the user based on the user ID and password provided by the user in step 406. To validate the user means that the user is identified as one of the people allowed to certify executable files on a specific computer system.

After the user is validated, computer system 100 certifies the executable file 120 by writing a certification indicator into the executable file 120 in step 408. A certification indicator comprises any values, identifiers, control characters, or codes that certify an executable file for a particular computer. The certification indicator is meant to be an indication that is maintained in the executable file 120, which shows that the executable file 120 is certified to run on computer system 100. In one example, the certification indicator may comprise a computer ID for computer system 100. Computer system 100, or its associated motherboard or operating system, may include a unique computer ID that distinguishes it from other computers. To certify the executable file 120, computer system 100 may write its unique computer ID (or an encrypted or encoded version of the computer ID) into the executable file 120, such as in a header or in meta-data of the executable file 120. Computer system 100 may also write the computer ID as part of a checksum or hash sum into the executable file 120. The certification indicator may also limit the permissions to execute the executable file 120 to a limited set of users as well as an expiration date to control when someone may need to re-certify and ensure the executable file is still safe based upon the parameters at that time.

In step 410, computer system 100 determines a modification indicator for the executable file 120. A modification indicator comprises any values, identifiers, control characters, or codes that are computed based upon file properties at the time the file was certified. Some of the file properties may include a size of the file, a sum of ASCII codes of every nth value, or many other industry-standard checksum or hash sum algorithms. The properties are selected in such a way that if someone modifies or tampers with a file, then these properties would change. The modification indicator will allow computer system 100 to later determine if the executable file 120 has been modified. In step 412, computer system 100 writes the modification indicator into the executable file 120, such as in a header, in meta-data, or some other control-type portion of executable file 120.

Computer system 100 may certify an entire software package at once. Therefore, each executable file in the software package does not need to be certified individually. Also, executable files that are part of the operating system 110 of computer system 100 are automatically certified and do not need to be individually certified according to process 400.

Figure 5:
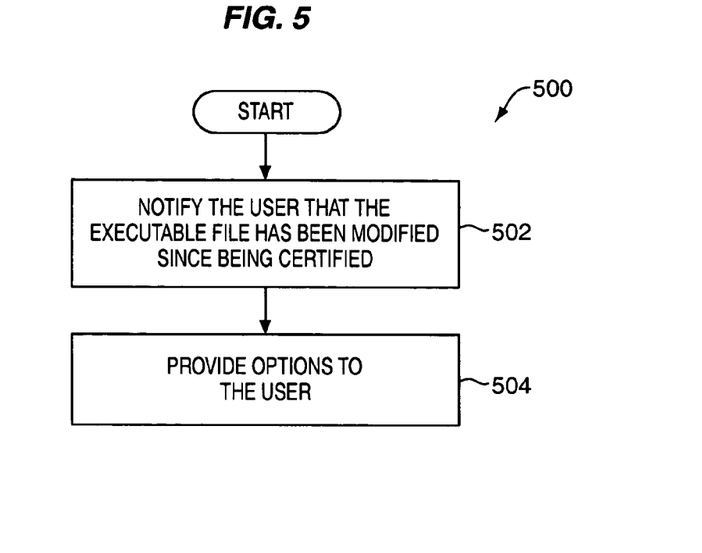
FIG. 5 is a flowchart illustrating another process in an exemplary embodiment of the invention.

FIG. 5 is a flowchart illustrating a process 500 in an exemplary embodiment of the invention. In FIG. 2, if computer system 100 determines that the executable file 120 has been modified in step 208, computer system 100 may also perform the steps of process 500. In step 502, computer system 100 notifies the user that the executable file 120 has been modified since being certified. Computer system 100 may notify the user with a pop-up window or similar message. In step 504, computer system 100 provides options to the user on how to proceed. For instance, one option may be to re-certify the executable file 120 (see process 400 in FIG. 4). Another option may be to delete the executable file 120.

Figure 6:
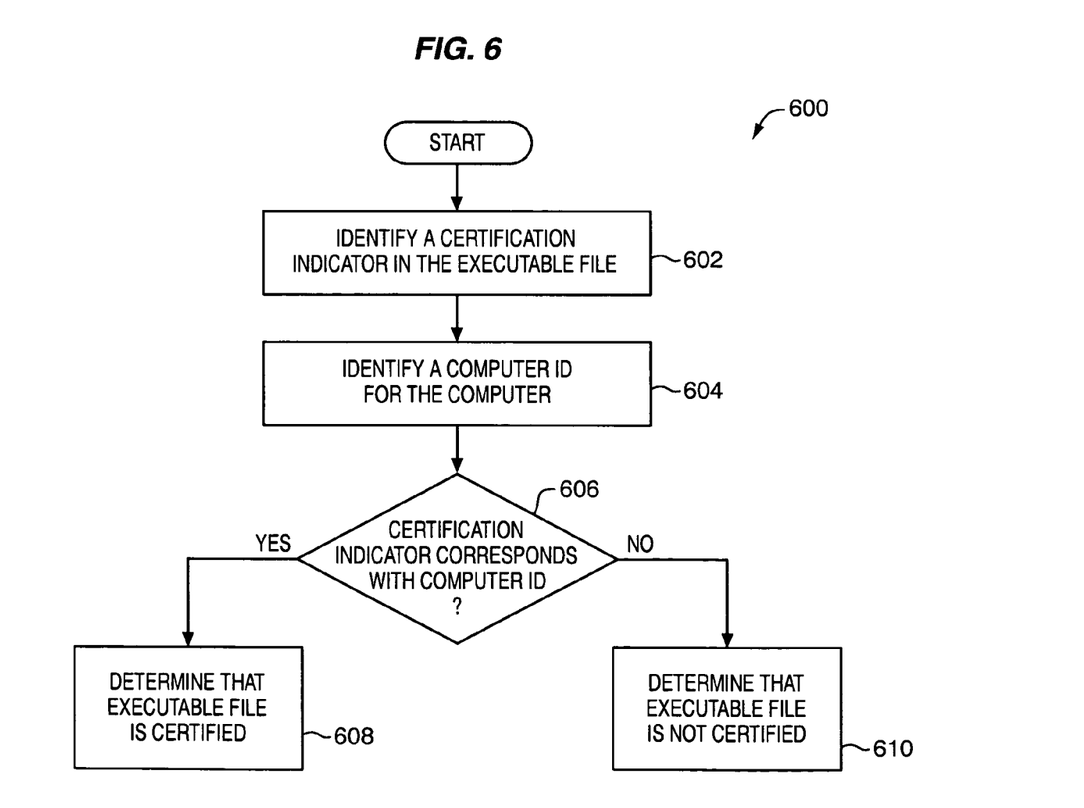
FIG. 6 is a flowchart illustrating a process for determining if an executable file is certified in an exemplary embodiment of the invention.

FIG. 6 is a flowchart illustrating a process 600 for determining if the executable file 120 is certified in an exemplary embodiment of the invention. In step 204 in FIG. 2, computer system 100 determines if the executable file 120 is certified to run on this computer system 100. Computer system 100 may use process 600 to make this determination. In step 602, computer system 100 identifies a certification indicator in the executable file 120. In one example, the certification indicator may comprise a computer ID for computer system 100. The certification indicator may be read by computer system 100 from a header, meta-data, or another other control-type portion of executable file 120.

In step 604, computer system 100 identifies a computer ID for the computer. Assume for this embodiment that computer system 100, or its associated motherboard or operating system, includes a unique computer ID that distinguishes it from other computers. The computer ID is like a social security number for computers. In step 606, computer system 100 determines if the certification indicator read from the executable file corresponds with the computer ID for computer system 100. To "correspond with" may mean that the certification indicator matches the computer ID. To "correspond with" may also mean that the certification indicator and the computer ID produce the same value when passed through an algorithm or decryption process. If the certification indicator corresponds with the computer ID (and the certification has not expired if there was any expiration date maintained as part of the certification process), then computer system 100 determines that the executable file 120 is certified for computer system 100 in step 608. If the certification indicator does not correspond with the computer ID, then computer system 100 determines that the executable file 120 is not certified in step 610.

Figure 7:
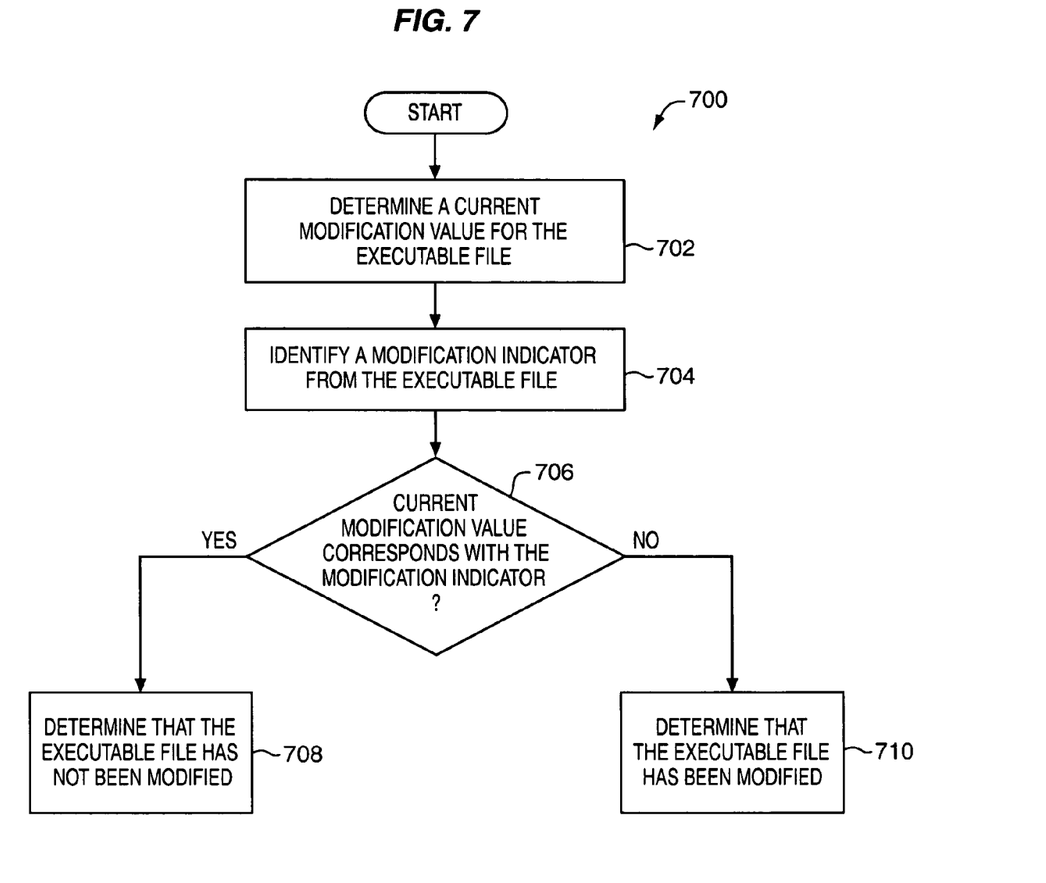
FIG. 7 is a flowchart illustrating a process for determining if an executable file has been modified in an exemplary embodiment of the invention.

FIG. 7 is a flowchart illustrating a process 700 for determining if the executable file 120 has been modified in an exemplary embodiment of the invention. In step 208 in FIG. 2, computer system 100 determines if the executable file 120 has been modified since being certified. Computer system 100 may use process 700 to make this determination. In step 702, computer system 100 determines a current modification value for the executable file 120. A current modification value comprises any value computed based upon current file properties. Some of the file properties may include a size of the file, a sum of ASCII codes of every nth value, or many other industry-standard checksum or hash sum algorithms. For instance, computer system 100 may determine the current modification value by determining a number of bytes for the executable file 120. Computer system 100 may also calculate a checksum value, a hash sum value, or some other value based on an algorithm to determine the current modification value.

In step 704, computer system 100 identifies a modification indicator from the executable file 120. For instance, computer system 100 may identify the modification indicator by reading the modification indicator from a header, meta-data, or another other control-type portion of executable file 120. The modification indicator may have been written into the executable file 120 at the time of certification.

In step 706, computer system 100 determines if the current modification value calculated for the executable file 120 corresponds with the modification indicator read from the executable file. To "correspond with" may mean that the current modification value matches or equals the modification indicator. To "correspond with" may also mean that the current modification value and the modification indicator produce the same value when passed through an algorithm or decryption process. Although the certification expiration date has been shown to be maintained with the certification indicators in this embodiment, the expiration details can easily be kept as part of the modification value.

If the current modification value does correspond with the modification indicator, then computer system 100 determines that the executable file 120 has not been modified since being certified, in step 708. If the current modification value does not correspond with the modification indicator, then computer system 100 determines that the executable file 120 has been modified since being certified, in step 710.

In summary, because many viruses are included in executable files, virus attacks may be prevented by requiring executable files to be certified before they can run. Executable files that are viruses cannot be inadvertently run according to the certification process described above. Computers and operating systems advantageously have another layer of protection against viruses.

We claim:

1. A method of operating a computer system, the method comprising the steps of:
 receiving an instruction to run an executable file;
 determining if the executable file is certified to run on the computer system by:
  identifying a certification indicator in the executable file;
  identifying a computer ID for the computer system;
  determining if the certification indicator corresponds with the computer ID; and
  determining that the executable file is certified to run on the computer system if the certification indicator corresponds with the computer ID;

determining if the executable file has been modified since being certified for the computer system; and running the executable file responsive to a determination that the executable file is certified to run on the computer system and that the executable file has not been modified since being certified.

2. The method of claim 1 further comprising the step of:
preventing the executable file from running responsive to a determination that the executable file is not certified or that the executable file has been modified since being certified.

3. The method of claim 1 further comprising the steps of:
notifying a user of the computer system if the executable file is not certified; and
determining if the executable file is certified to run on another computer system.

4. The method of claim 1 further comprising the steps of:
receiving a user ID and a password from a user of the computer system;
validating the user based on the user ID and password; and
certifying the executable file by writing a certification indicator into the executable file.

5. The method of claim 4 further comprising the steps of:
determining a modification indicator for the executable file; and
writing the modification indicator into the executable file.

6. The method of claim 1 wherein the step of determining if the executable file has been modified since being certified for the computer system comprises the steps of:
determining a current modification value for the executable file;
identifying a modification indicator from the executable file;
determining if the current modification value corresponds with the modification indicator; and
determining that the executable file has been modified if the current modification value does not correspond with the modification indicator.

7. A software product for a computer system, the software product comprising:
operating system software when executed by a processing system that:
receives an instruction to run an executable file,
determines if the executable file is certified to run on the computer system when the operating system software:
identifies a certification indicator in the executable file,
identifies a computer ID for the computer system,
determines if the certification indicator corresponds with the computer ID, and
determines that the executable file is certified to run on the computer system if the certification indicator corresponds with the computer ID,
determines if the executable file has been modified since being certified for the computer system, and
runs the executable file responsive to a determination that the executable file is certified and that the executable file has not been modified since being certified; and
a storage system that stores the operating system software.

8. The software product of claim 7 wherein the operating system software prevents the executable file from running responsive to a determination that the executable file is not certified or that the executable file has been modified since being certified.

9. The software product of claim 7 wherein the operating system software notifies a user of the computer system if the executable file is not certified and determines if the executable file is certified to run on another computer system.

10. The software product of claim 7 wherein the operating system software receives a user ID and a password from a user of the computer system, validates the user based on the user ID and password, and certifies the executable file by writing a certification indicator into the executable file.

11. The software product of claim 10 wherein the operating system software determines a modification indicator for the executable file and writes the modification indicator into the executable file.

12. The software product of claim 7 wherein the operating system software determines a current modification value for the executable file, identifies a modification indicator from the executable file, determines if the current modification value corresponds with the modification indicator, and determines that the executable file has been modified if the current modification value does not correspond with the modification indicator.

13. A computer system, comprising:
a user interface configured to receive an instruction to run an executable file; and
a processing system, responsive to receiving the instruction from the user interface, that:
determines if the executable file is certified to run on the computer system when the operating system software:
identifies a certification indicator in the executable file,
identifies a computer ID for the computer system,
determines if the certification indicator corresponds with the computer ID, and
determines that the executable file is certified to run on the computer system if the certification indicator corresponds with the computer ID,
determines if the executable file has been modified since being certified for the computer system, and
runs the executable file responsive to a determination that the executable file is certified and that the executable file has not been modified since being certified.

14. The computer system of claim 13 wherein the processing system prevents the executable file from running responsive to a determination that the executable file is not certified or that the executable file has been modified since being certified.

15. The computer system of claim 13 wherein the processing system notifies a user of the computer system if the executable file is not certified and determines if the executable file is certified to run on another computer system.

16. The computer system of claim 13 wherein the processing system receives a user ID and a password from a user of the computer system, validates the user based on the user ID and password, and certifies the executable file by writing a certification indicator into the executable file.

17. The computer system of claim 13 wherein the processing system determines a current modification value for the executable file, identifies a modification indicator from the executable file, determines if the current modification value corresponds with the modification indicator, and determines that the executable file has been modified if the current modification value does not correspond with the modification indicator.

* * * * *